United States Patent [19]
Gupta

[11] Patent Number: 6,100,904
[45] Date of Patent: Aug. 8, 2000

[54] CURVATURE SMOOTHING

[75] Inventor: Naresh C. Gupta, Santa Clara, Calif.

[73] Assignee: Adobe Systems Incorporated, San Jose, Calif.

[21] Appl. No.: 08/882,692

[22] Filed: Jun. 25, 1997

[51] Int. Cl.[7] .................................................. G06F 17/24
[52] U.S. Cl. .......................................................... 345/442
[58] Field of Search ............................ 345/442; 382/266, 382/269, 275

[56] References Cited

U.S. PATENT DOCUMENTS 5,594,853  1/1997  Salesin et al. ........................... 345/441

OTHER PUBLICATIONS

A. Blake, et al., "Weak Continuity Constraints Generate Uniform Scale–Space Descriptions of Plane Curves" Dept. Of Computer Science, Scotland, (date unavailable).

Andrew Blake, et al., *Visual Reconstruction,* Chapter 2 (Applications of Piecewise Continuous Reconstruction), 1987, pp. 16–36.

Projective Solutions, Inc., *ScanLab manual,* Apr. 8, 1990.

Adobe Systems, Inc., "Technical Note #5012", *The Type 42 Font Format Specification,* Mar. 1, 1993.

Adobe Systems, Inc., "Technical Note #5092", *CID–Keyed Font Technology Overview,* Sep. 12, 1994.

Adobe Systems, Inc., "Technical Specification #5014, Version 1.0", *Adobe CMap and CIDFont Files Specification,* Oct. 16, 1995.

Richard L. Burden, et al., *Numerical Analysis,* Second Edition, Chapter 9 (Numerical Solutions of Nonlinear Systems of Equations), 1981, pp. 439–461.

B. Bascle and R. Deriche., "Stereo Matching, Reconstruction and Refinement of 3D Curves Using Deformable Contours", Computer Vision, 1993, pp. 421–430.

*Primary Examiner*—Mark R. Powell
*Assistant Examiner*—Thu Nguyen
*Attorney, Agent, or Firm*—Fish & Richardson P.C.

[57] ABSTRACT

A system generates a smoothed curve from a noisily drawn, multi-segmented curve by solving a smoothing function for a transposed curve which fits between end-points of the drawn curve. The transposed curve has an energy value related to the length of the transposed curve. The energy value has two components: a distortion factor and a smoothing factor. Numerical analysis methods are applied to evaluate the smoothing function and to identify the transposed curve with the lowest energy. The transposed curve with the lowest energy value is selected as the smoothed curve.

21 Claims, 3 Drawing Sheets

CURVATURE SMOOTHING

BACKGROUND

This invention relates to apparatus and method for smoothing a curve, and particularly, to apparatus and method for smoothing a multi-segmented curve.

An important class of computer programs includes computer aided design (CAD) tools and graphics illustration software. To create a drawing using a CAD layout or a graphics design software, users typically select one or more objects and place each object on a drawing sheet, as displayed by the software on a monitor or other suitable display device. Users can also edit and manipulate these objects to achieve the desired appearance. Application software normally supplies common symbols or objects such as squares, rectangles, circles, and ovals, among others, for the user to select and manipulate in arriving at the design. Further, the software also typically provides tools to assist the user in drafting straight lines and curvilinear segments on the digital drawing.

The process of placing and editing curves is generally a trial and error process, as users generally are unable to draw one continuous curve with multiple turning points or segments on the computer. Such attempts generally result in a noisy curvilinear segment manifesting itself as a sequence of jagged curves, each of which is defined by begin and end points. In addition to being visually undesirable, the editing, displaying and saving of the sequence of jagged curves can become quite complex. Thus, for the sake of visual appearance and manipulation simplicity, it is desirable to replace the noisy curves with smoothed versions of these curves.

To characterize the curvilinear segment, the corners between adjacent drawn segments need to be identified from the jagged, noisy curve. An accurate and quick method for determining the end points that is noise tolerant and that provides a good localization of the corner is disclosed in the commonly owned, co-pending application having Ser. No. 08/882,695, entitled "CHARACTERIZATION OF CORNERS OF CURVILINEAR SEGMENT" filed concurrently, hereby incorporated by reference.

Once the begin and end points have been identified, the curve can be smoothed. Conventional processes smooth adjacent points on the curve. Such smoothing reduces the jaggedness of the curvilinear segment. However, such averaging generally flattens the curve and can change the overall shape of the intended curve. Furthermore, averaging may cause a shrinkage of the actual curve radius, leading to an improper characterization of the curve. Thus, it is desirable to smooth the curve of a noisily drawn curve without affecting its characteristics, including the shape and radius.

SUMMARY

In general, the invention features a computer-implemented method for smoothing the curvature of an inaccurately drawn curve. The invention generates a smoothed curve from a noisily drawn, multi-segmented curve by solving a smoothing function which defines a transposed curve. Each transposed curve has an energy value which is related to its length, among others. The transposed curve which minimizes the energy of the smoothing function is selected as the smoothed curve.

The energy value E is a composite of a number of factors, as follows:

$$E = D + \lambda^2 * S$$

where D represents the distortion factor;

$\lambda$ is the smoothness parameter and larger values of $\lambda$ indicating greater smoothness; and S is a smoothness function.

Additional factors or constraints can be imposed to achieve certain curve characteristics. One such constraint can be that the average departure of the transposed curve from the drawn curve be zero. This can be imposed as $$\Sigma(X_i - x_i) = 0$$

$$\Sigma(Y_i - y_i) = 0$$

The distortion factor takes into account the relationship between the points on the drawn curve and the transposed curve. The smoothing factor S imparts smoothness to the curve. One embodiment minimizes a measure of the length of the curve. The smoothing parameter $\lambda$ controls the level of smoothing such that, a large value imparts greater smoothness. In this manner, the smoothing function E identifies the transposed curve with the minimum energy.

Numerical methods are applied to evaluate the smoothing function and to identify the transposed curve with the minimal energy which fits between end-points of the drawn curve. The transposed curve with the lowest energy value E is selected as the smoothed curve.

Among the advantages of the invention are one or more of the following. The invention performs the smoothing of the curve without affecting the overall shape of the intended curve. Further, the invention smooths the curve without shrinking the actual curve radius.

Other features and advantages of the invention will become apparent from the following description and from the claims.

DETAILED DESCRIPTION

Figure 1:
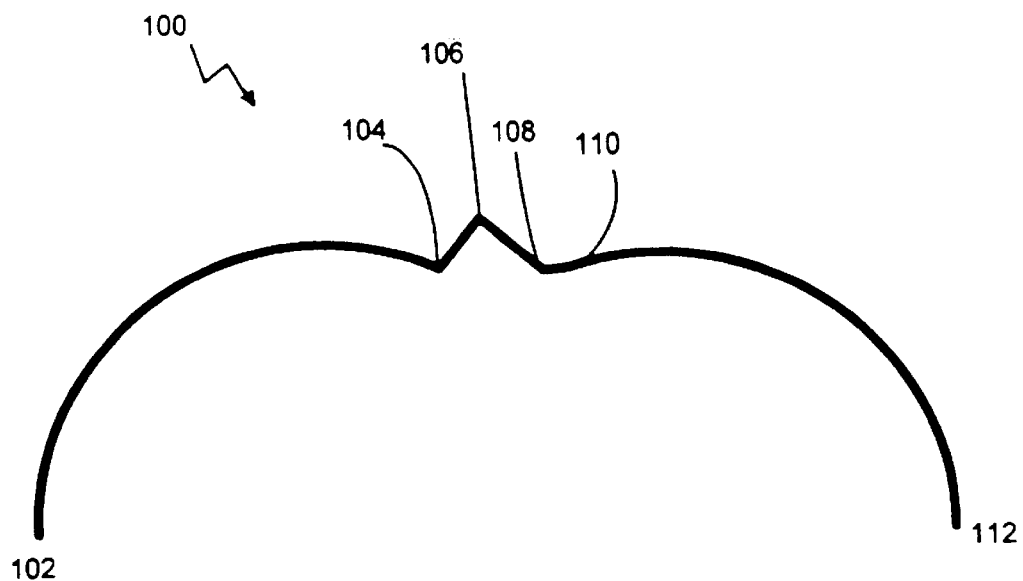
FIG. 1 illustrates a curve upon which a process for smoothing is to be applied.

FIG. 1 shows a drawn curve segment 100 annotated with information to illustrate the operation of the present invention in generating a smoothed curve based on the noisy segment or curve 100. In FIG. 1, the drawn segment or curve 100 has a start point 102 and an end point 112. Further, N–1 points located between the start point 102 and end point 112 are selected for analysis. Among these points are points 104, 106, 108 and 110 which represent noise or perturbation inadvertently introduced during the generation of the curve 100 by the user. The noise represented by points 104, 106, 108 and 110 break the smooth flow of the curve 100 and need to be minimized if the curve 100 is to be smoothed.

Figure 3:
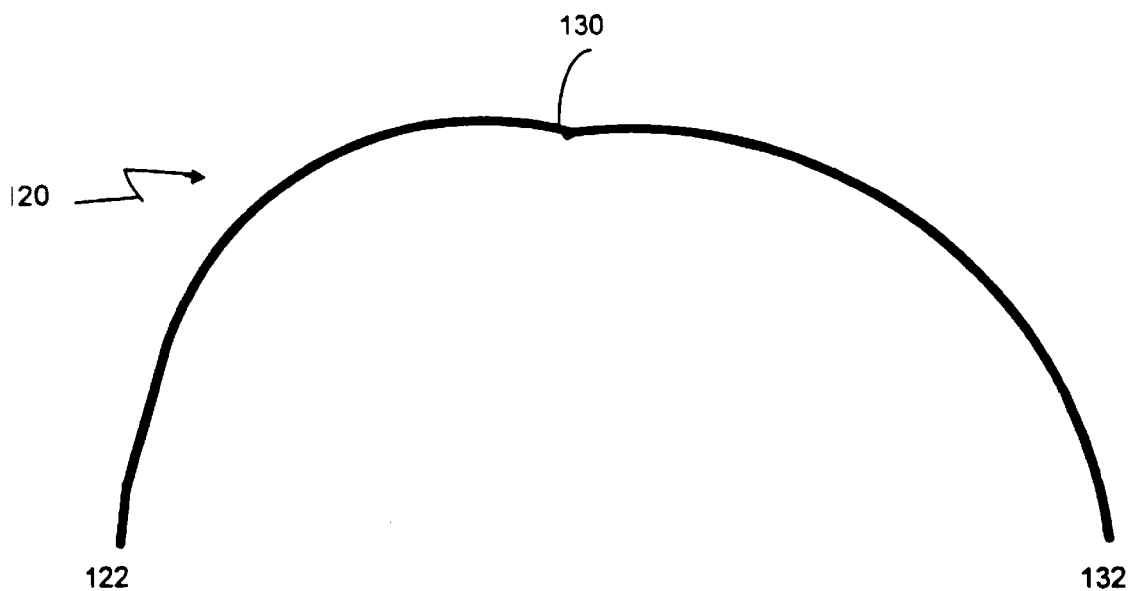
FIG. 3 illustrates the resulting smoothed curve, as generated by the process of FIG. 2.

The method solves a smoothing function defining a transposed curve 120 (FIG. 3) located between the curve end points (points 102 and 112) of the drawn curve 100 (FIG. 1). During the smoothing process, points representing perturbations are projected closer together by the smoothing function, effectively reducing the overall length of the transposed curve 120. Hence, by solving the smoothing function to minimize the energy associated with the curve, the drawn curve 100 is transposed into the smoothed curve 120 (FIG. 3).

Figure 2:
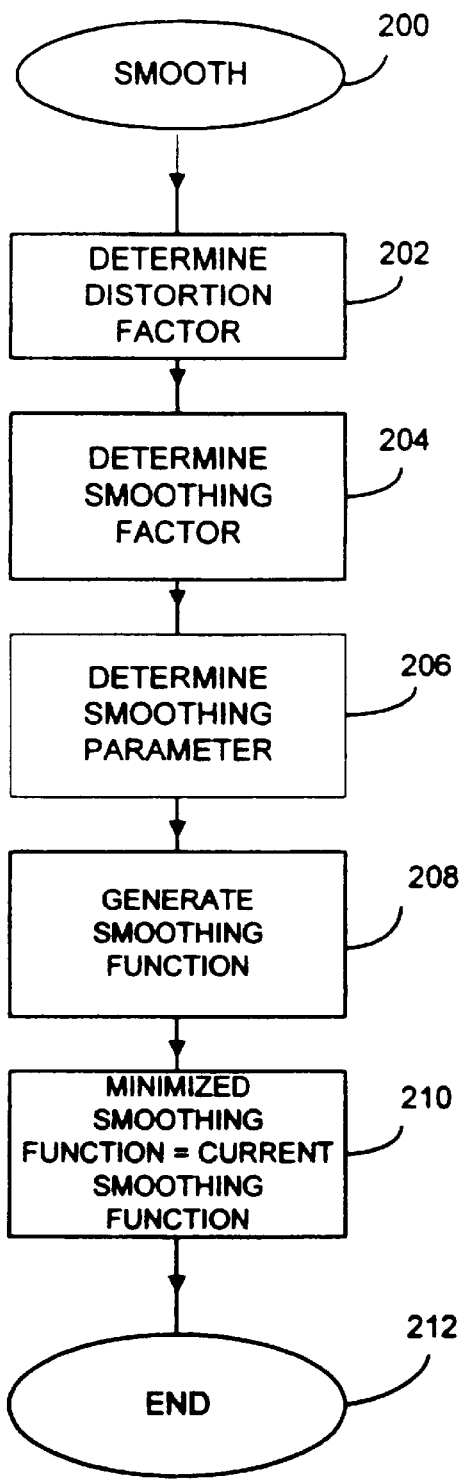
FIG. 2 is a flow chart of the process of smoothing the curve.

Referring now to FIG. 2, a method 200 for smoothing the curve is detailed. In general, the method 200 attempts to find the transposed smoothed curve 120 from the originally drawn curve 100. The smoothed curve 120 is associated with an energy value E which advantageously is related to the length of the transposed smoothed curve 120, although other characterizations for E can be used.

The transposed curve 120 is a mapping of coordinate (X,Y) for each point i on the drawn curve 100 to coordinate (x,y) on the smoothed curve 120, subject to a constraint that the energy value for the smoothed curve 120 is minimized as the lowest energy value E. As noted earlier, the energy value E is expressed as:

$$E=D+\lambda^2 * S$$

In step 202, the method 200 determines a distortion factor D to be used in the analysis of E. The distortion factor D is a measure of the movement of the transposed curve from the original curve. A number of expressions for D may be used, including characterizing D as a function of the actual or the square of the difference in distance between the corresponding points on the curves.

In one embodiment, D is expressed as the sum of the difference in distance between point i on the drawn curve and on the transposed curve, as follows:

$$D = \sum_{i=1}^{N-1} ((X_i - x_i)^2 + (Y_i - y_i)^2)$$

where D is a function of the sum of the square of the distance between point i on the drawn curve, represented as $(X_i, Y_i)$ and on the transposed curve, represented as $(x_i, y_i)$.

Alternatively, D may be expressed as the sum of the distance between point i on the drawn curve and on the transposed curve:

$$D = \sum_{i=1}^{N-1} \sqrt{(X_i - x_i)^2 + (Y_i - y_i)^2}$$

Other methods of characterizing D include expressing D as a function of the area between the original curve and the transposed curve, among others.

After the distortion factor D has been determined (step 202), the method determines a smoothing factor S in step 204. S is expressed as a sum of the square of the length of each segment on the transposed curve as follows:

$$S = \sum_{i=0}^{N-1} ((x_i - x_{i+1})^2 + (y_i - y_{i+1})^2)$$

Alternatively, S may be expressed as a function of the length of the transposed curve:

$$S = \sum_{i=0}^{N-1} \sqrt{(x_i - x_{i+1})^2 + (y_i - y_{i+1})^2}$$

Next, the method determines a smoothing parameter λ in step 206. λ is a user selectable value. If λ is set to 0, the smoothed curve will mimic the original drawn curve faithfully. If λ is set at infinity, the smoothed curve will be a straight line.

In step 208, a smoothing function with an energy value E is generated which is representative of the transposed curve. As E is a composite of factors $$E=D+\lambda^2 * S$$

one embodiment of E can be expressed as:

$$E = \sum_{i=1}^{N-1} ((x_i - X_i)^2 + (y_i - Y_i)^2) + \lambda^2 \sum_{i=0}^{N-1} \sqrt{(x_i - x_{i+1})^2 + (y_i - y_{i+1})^2}$$

Other suitable combinations using D and S may be used as well.

Next, in step 210, the smoothed curve is obtained by solving the 2N−2 equations representing the first partial derivative of E with respect to the x and y coordinates of point i, as follows:

$$\frac{\partial E}{\partial x_i} = 0; \frac{\partial E}{\partial y_i} = 0$$

where $$\frac{\partial E}{\partial x_i} = (x_i - X_i) + \frac{\lambda^2 (x_i - x_{i+1})}{d(O_i, O_{i+1})} + \frac{\lambda^2 (x_i - x_{i-1})}{d(O_i, O_{i-1})} = 0$$

and $$\frac{\partial E}{\partial y_i} = (y_i - Y_i) + \frac{\lambda^2 (y_i - y_{i+1})}{d(O_i, O_{i+1})} + \frac{\lambda^2 (y_i - y_{i-1})}{d(O_i, O_{i-1})} = 0$$

i through N−1;
$O_i$=point located on transposed curve at $(x_i, y_i)$; and
d is the distance between point P located at x,y and point Q located at x', y', defined as:

$$d(P, Q) = \sqrt{(x - x')^2 + (y - y')^2}$$

The series of equations can be solved using a number of techniques known to those skilled in the art. For example, the solution may be generated using gradient descent methods as follows:

$$x_i^{k+1} = x_i^k - \epsilon \left( \frac{\partial E}{\partial x_i} \right)$$

and $$y_i^{k+1} = y_i^k - \epsilon \left( \frac{\partial E}{\partial y_i} \right)$$

where ϵ is a constant whose value may be based on a second derivative of E and where k is an iteration counter such that the next x and y values are generated based in part on the current values of x and y.

Alternatively, the solution can be obtained using fixed point method by reducing the above system of equations to the following equations:

$$x_i \left( 1 + \frac{\lambda^2}{d_i} + \frac{\lambda^2}{d_{i-1}} \right) + \frac{\lambda^2 x_{i+1}}{d_i} + \frac{\lambda^2 x_{i-1}}{d_{i-1}} = X_i$$

and $$y_i \left( 1 + \frac{\lambda^2}{d_i} + \frac{\lambda^2}{d_{i-1}} \right) + \frac{\lambda^2 y_{i+1}}{d_i} + \frac{\lambda^2 y_{i-1}}{d_{i-1}} = Y_i$$

where $d_i = d(O_i, O_{i+1})$

These systems of equations can be rewritten in array format as follows:

$$\left| \begin{array}{ccccc} \left(1 + \frac{\lambda^2}{d_0} + \frac{\lambda^2}{d_1}\right) & \frac{\lambda^2}{d_1} & & & \\ \frac{\lambda^2}{d_1} & \left(1 + \frac{\lambda^2}{d_1} + \frac{\lambda^2}{d_2}\right) & \frac{\lambda^2}{d_2} & & \\ \vdots & & & & \\ 0 & 0 & 0 & \ldots & \frac{\lambda^2}{d_{N-2}} & \left(1 + \frac{\lambda^2}{d_{N-2}} + \frac{\lambda^2}{d_{N-1}}\right) \end{array} \right| \left| \begin{array}{c} x_1 \\ x_2 \\ \vdots \\ x_{N-1} \end{array} \right| =$$

$$\left| \begin{array}{c} X_1 - \lambda^2 \frac{x_0}{d_0} \\ \vdots \\ X_{N-1} - \frac{x^N}{d_{N-1}} \end{array} \right|$$

The above matrix can be expressed as:

$$A(\bar{x}, \bar{y})\bar{x} = \bar{X}$$

and $$B(\bar{x}, \bar{y})\bar{y} = \bar{Y}$$

which can be solved iteratively as:

$$\bar{x}^{k+1} = [A(\bar{x}^k, \bar{y}^k)]^{-1} \bar{X}$$

and $$\bar{y}^{k+1} = [B(\bar{x}^{k+1}, \bar{y}^k)]^{-1} \bar{Y}$$

The above numerical methods iteratively solve for the transposed curve with the lowest energy value E. Such transposed curve is selected as the smoothed curve. Based on the smoothing function associated with the smoothed curve and the points on the drawn curve, the points of the smooth curve are generated. In this manner, the method 200 smooths the drawn curve 100 without affecting the overall shape of the intended curve. Further, the method 200 smooths the drawn curve 100 without shrinking the actual curve radius.

Referring now to FIG. 3, a transposed curve 120 which is generated as the result of the method 200 is illustrated. The transposed curve 120 is a smoothed version of the curve 100 of FIG. 1. The transposed curve 120 has a begin point 122 and an end point 132 which matches points 102 and 112 (FIG. 1), respectively. The transposed curve 120 also has one or more transposed disturbance points 130 which are positioned relatively closer to the transposed curve 120 than the position of points 104–110 (FIG. 1) relative to the drawn curve 100. The relatively close position of the disturbance point 130 to the transposed curve 120 results in a generally smoother curve than the drawn curve 100 (FIG. 1).

The smoothness of the transposed curve 120 can be measured in part by its length. In FIG. 3, the length of the transposed curve 120 is shorter than the length of the drawn curve 100 of FIG. 1. The shorter distance is due to the reduced differences between the disturbance points on the transposed curve 120 (FIG. 3) relative to the disturbance points on the drawn curve 100 (FIG. 1).

Figure 4:
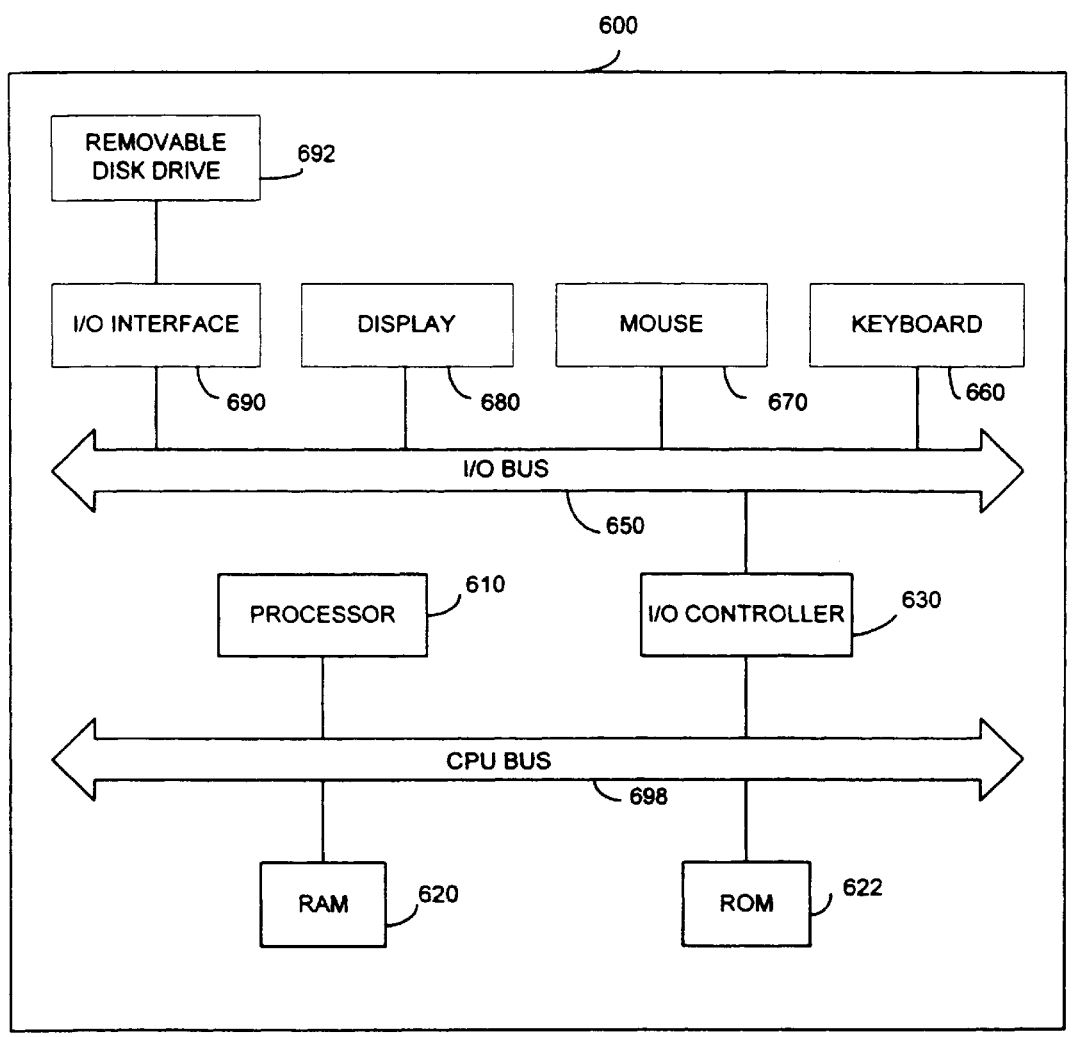
FIG. 4 illustrates a computer system suitable for use with the invention.

The invention may be implemented in digital hardware or computer software, or a combination of both. Preferably, the invention is implemented in a computer program executing in a computer system. Such a computer system may include a processor, a data storage system, at least one input device, and an output device. FIG. 4 illustrates one such computer system 600, including a processor (CPU) 610, a RAM 620, a ROM 622 and an I/O controller 630 coupled by a CPU bus 698. The I/O controller 630 is also coupled by an I/O bus 650 to input devices such as a keyboard 660, a mouse 670, and output devices such as a monitor or a display 680. Additionally, one or more data storage devices 692 is connected to the I/O bus via an I/O interface 690.

Further, variations to the basic computer system of FIG. 4 are within the scope of the present invention. For example, instead of using a mouse as the input devices, and a pressure-sensitive pen or tablet may be used to generate the curve location information.

It will be apparent to those skilled in the art that various modifications can be made to the curve smoothing process of the instant invention without departing from the scope and spirit of the invention, and it is intended that the present invention cover modifications and variations of the curve smoothing process of the invention provided they come within the scope of the appended claims and their equivalents.

What is claimed is:

1. A computer-implemented method for generating a smoothed curve from a drawn curve, comprising:

defining a smoothing function for which an energy E is a function of points ($X_i$, $Y_i$) on the drawn curve and points ($x_i$, $y_i$) on the smoothed curve, the energy E having a distortion factor and a smoothing factor;

computing values of ($x_i$, $y_i$) for which the energy E has a minimum value; and using the computed values of ($x_i$, $y_i$) to generate the smoothed curve.

2. The method of claim 1, wherein the distortion factor is a function of the square of the distance between corresponding points ($X_i$, $Y_i$) on the drawn curve and ($x_i$, $y_i$) on the smoothed curve.

3. The method of claim 1, wherein the distortion factor is a function of the distance between corresponding points ($X_i$, $Y_i$) on the drawn curve and ($x_i$, $y_i$) on the smoothed curve.

4. The method of claim 1, wherein the distortion factor is:

$$\sum_{i=1}^{N-1} \sqrt{(X_i - x_i)^2 + (Y_i - y_i)^2} .$$

5. The method of claim 1, wherein the smoothing factor is a function of the smoothed curve length.

6. The method of claim 1, wherein the smoothing factor is determined by summing the length of each segment on the smoothed curve defined by the points ($x_i$, $y_i$).

7. The method of claim 1, wherein the smoothing factor is:

$$\sum_{i=1}^{N-1} \sqrt{(x_i - x_{i+1})^2 + (y_i - y_{i+1})^2}\,.$$

8. The method of claim 1, wherein computing values of $(x_i, y_i)$ for which the energy E has a minimum value comprises solving the following system of homogeneous partial differential equations for $(x_i, y_i)$ $$\frac{\partial E}{\partial x_i} = 0;\ \frac{\partial E}{\partial y_i} = 0.$$

9. The method of claim 1, wherein the smoothing function with an energy value E is defined as:

$$E = D + \lambda^2 \cdot S$$

where $\lambda$ is a selectable smoothness parameter between 0 and infinity.

10. A memory device storing computer-readable instructions for generating a smoothed curve from a drawn curve, comprising instructions to:
define a smoothing function for which an energy E is a function of points $(X_i, Y_i)$ on the drawn curve and points $(x_i, y_i)$ on the smoothed curve, the energy E having a distortion factor and a smoothing factor;
compute values of $(x_i, y_i)$ for which the energy E has a minimum value; and
use the computed values of $(x_i, y_i)$ to generate the smoothed curve.

11. The memory device of claim 10, wherein the distortion factor is a function of the square of the distance between corresponding points $(X_i, Y_i)$ on the drawn curve and $(x_i, y_i)$ on the smoothed curve.

12. The memory device of claim 10, wherein the distortion factor is a function of the distance between corresponding points $(X_i, Y_i)$ on the drawn curve and $(x_i, y_i)$ on the smoothed curve.

13. The memory device of claim 10, wherein the smoothing factor is a function of the smoothed curve length.

14. The memory device of claim 10, wherein the smoothing factor is:

$$\sum_{i=0}^{N-1} \sqrt{(x_i - x_{i+1})^2 + (y_i - y_{i+1})^2}\,.$$

15. The memory device of claim 10, wherein the distortion factor is:

$$\sum_{i=1}^{N-1} \sqrt{(X_i - x_i)^2 + (Y_i - y_i)^2}\,.$$

16. The memory device of claim 10, wherein instructions to compute values of $(x_i, y_i)$ for which the energy E has a minimum value comprise instructions to solve the following system of homogeneous partial differential equations for $(x_i, y_i)$ $$\frac{\partial E}{\partial x_i} = 0;\ \frac{\partial E}{\partial y_i} = 0.$$

17. A computer system for characterizing a drawn curve defined by a sequence of points on a two-dimensional space, comprising:

a display for displaying a raster image;
a user input device for receiving user input; and
a processor programmed to:
define a distortion factor D associated with the smoothed curve in accordance with $$D = \sum_{i=1}^{N-1} ((X_i - x_i)^2 + (Y_i - y_i)^2)$$

where the $(X_i, Y_i)$ represent points on the drawn curve and the $(x_i, y_i)$ represent points on the smoothed curve;
define a smoothing factor S associated with the curve in accordance with:

$$S = \sum_{i=0}^{N-1} \sqrt{(x_i - x_{i+1})^2 + (y_i - y_{i+1})^2}\,;$$

generate transposed curves by generating sets of values $(x_i, y_i)$ for i=1 through N−1, each set of values generating one transposed curve, each curve having an energy value E expressed in terms of the distortion factor and the smoothing factor in accordance with:

$$E = D + \lambda^2 \cdot S$$

where $\lambda$ is the smoothness parameter; and
select the transposed curve with a minimum energy as the smoothed curve.

18. The computer system of claim 17, wherein generating sets of values $(x_i, y_i)$ for i=1 through N−1 comprises iteratively solving the following system of homogeneous partial differential equations, each iteration providing one set of values $(x_i, y_i)$ for i=1 through N−1:

$$\frac{\partial E}{\partial x_i} = 0;\ \frac{\partial E}{\partial y_i} = 0.$$

19. The computer system of claim 18, wherein the homogeneous partial differential equations are:

$$\frac{\partial E}{\partial x_i} = (x_i - X_i) + \frac{\lambda^2(x_i - x_{i+1})}{d(O_i, O_{i+1})} + \frac{\lambda^2(x_i - x_{i-1})}{d(O_i, O_{i-1})} = 0$$

and $$\frac{\partial E}{\partial y_i} = (y_i - Y_i) + \frac{\lambda^2(y_i - y_{i+1})}{d(O_i, O_{i+1})} + \frac{\lambda^2(y_i - y_{i-1})}{d(O_i, O_{i-1})} = 0$$

where
i=1 through N−1;
$O_i$=point located on transposed curve at $(x_i, y_i)$; and
d is the distance between point P located at x, y and point Q located at x', y', defined as:
$$d(P, Q) = \sqrt{(x - x')^2 + (y - y')^2}\,.$$

20. The computer system of claim 17, wherein the energy value is evaluated for each of a plurality of transposed curves.

21. The computer system of claim 17, wherein the drawn curve is generated by a computer.

* * * * *